(12) United States Patent
Tatah et al.

(10) Patent No.: US 6,347,171 B1
(45) Date of Patent: Feb. 12, 2002

(54) METHOD AND APPARATUS FOR FORMING A DIFFRACTION GRATING

(75) Inventors: Abdelkrim Tatah, Arlington; Xinbing Liu, Acton, both of MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/281,908

(22) Filed: Mar. 31, 1999

(51) Int. Cl.⁷ ................................................ G02B 6/34
(52) U.S. Cl. ...................... 385/37; 385/123; 359/563; 359/566; 359/569
(58) Field of Search .................... 385/37, 123; 359/558, 359/559, 560, 561, 562, 575; 430/290

(56) References Cited

U.S. PATENT DOCUMENTS

| | | |
|---|---|---|
| 4,274,706 A | 6/1981 | Tangonan |
| 4,279,464 A | 7/1981 | Colombini |
| 4,335,933 A | 6/1982 | Palmer |
| 4,622,662 A | 11/1986 | Laude et al. |
| 4,622,663 A | 11/1986 | Ishikawa et al. |
| 4,643,519 A | 2/1987 | Bussard et al. |
| 4,696,536 A | 9/1987 | Albares et al. |
| 4,842,405 A | 6/1989 | El-Sherif |
| 5,016,951 A | 5/1991 | Deason et al. |
| 5,022,734 A | 6/1991 | Kashyap |
| 5,450,512 A | 9/1995 | Asakura |
| 5,557,699 A * | 9/1996 | Kester et al. ............... 385/122 |
| 5,613,023 A | 3/1997 | Guillon et al. |
| 5,708,738 A | 1/1998 | Perez et al. |
| 5,718,738 A | 2/1998 | Kohnke et al. |
| 5,724,371 A | 3/1998 | Magne et al. |
| 5,768,454 A | 6/1998 | Chesnoy et al. |
| 5,778,119 A | 7/1998 | Farries |
| 5,818,987 A | 10/1998 | Bakhti et al. |
| 5,818,988 A | 10/1998 | Modavis |
| 5,837,169 A | 11/1998 | Rourke |
| 5,848,204 A | 12/1998 | Wanser |
| 5,857,043 A | 1/1999 | Cook et al. |
| 5,881,186 A * | 3/1999 | Starodubov .................. 385/37 |
| 5,881,187 A | 3/1999 | Modavis |

FOREIGN PATENT DOCUMENTS

JP 02000056112 A * 2/2000 .................. 385/37

OTHER PUBLICATIONS

Liu et al., "Ultrashort laser pulses tackle precision machining," Laser Focus World, Aug. 1997.

* cited by examiner

Primary Examiner—Rodney Bovernick
Assistant Examiner—Sung Pak
(74) Attorney, Agent, or Firm—Ratner & Prestia

(57) ABSTRACT

A method for forming a diffraction grating in an optical fiber. First and second ultrashort laser pulses are generated. The first and second ultrashort laser pulses are directed to intersect and form an interference pattern. The interference pattern includes periodic intensity variations which cause corresponding periodic changes in an index of refraction of the optical fiber. The ultrashort laser pulses and the optical fiber are configured to be self-focused by the cladding and core of the optical fiber.

21 Claims, 3 Drawing Sheets

METHOD AND APPARATUS FOR FORMING A DIFFRACTION GRATING

FIELD OF THE INVENTION

This invention relates to forming a diffraction grating and, in particular, to using a laser to form a diffraction grating in an optical fiber.

BACKGROUND OF THE INVENTION

Communication rates over optical fibers may be increased by using WDM to transmit multiple channels via a single optical fiber. The multiple channels may be simultaneously transmitted through the single optical fiber by modulating each input channel into a data stream at a separate wavelength.

Signals modulated at different wavelengths may be coupled to or from an optical fiber using diffraction gratings. A diffraction grating may be formed in an optical fiber by spatially modulating the index of refraction of the optical fiber according to a predetermined period corresponding to a predetermined wavelength.

SUMMARY OF THE INVENTION

The present invention provides a method and apparatus for forming a diffraction grating in an optical fiber. First and second ultrashort laser pulses are generated. The first and second ultrashort laser pulses are directed to intersect and form an interference pattern including periodic intensity variations in the optical fiber. The periodic intensity variations cause corresponding periodic changes in an index of refraction of the optical fiber.

According to an aspect of the present invention, the positioning of the first and second ultrashort pulses relative to each other, respective operating characteristics of the first and second ultrashort pulses, and composition of the optical fiber are configured to result in self-focusing of the first and second ultrashort pulses as they are transmitted through the optical fiber.

According to another aspect of the present invention, an optical fiber including a diffraction grating manufactured according to the present invention is provided.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
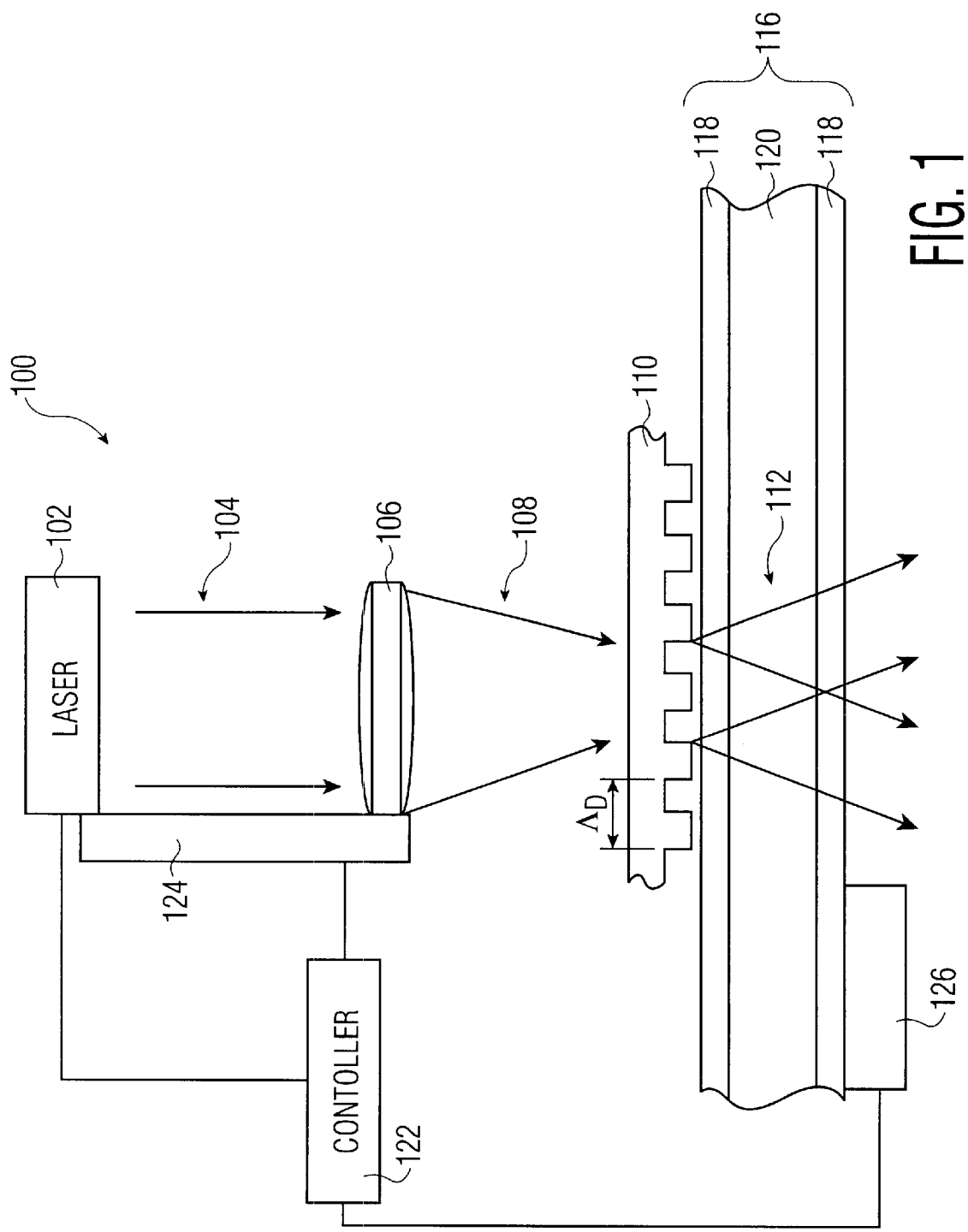
FIG. 1 shows an exemplary apparatus for forming a diffraction grating in an optical fiber according to the present invention.

Referring now to the drawing, in which like reference numerals refer to like elements throughout, FIG. 1 shows an apparatus 100 for forming a diffraction grating in an optical fiber 116 according to an exemplary embodiment of the present invention. A laser 102 generates ultrashort laser pulses 104 which are directed to a focusing lens 106. The focusing lens 106 focuses the ultrashort laser pulses 104 to form focused ultrashort laser pulses 108 which are directed to a diffractive optical element 110.

The diffractive optical element 110 generates diffracted ultrashort laser pulses 112 which intersect each other in the optical fiber 116. The optical fiber 116 includes a core 120 surrounded by a cladding 118. The core 120 has a core index of refraction and the cladding 118 has a cladding index of refraction.

The diffracted ultrashort laser pulses 112 intersect each other to form an interference pattern within the optical fiber 116. The interference pattern (described below with regard to FIG. 2) includes periodic intensity variations which cause corresponding periodic changes in the core index of refraction and the cladding index of refraction.

In the exemplary embodiment of FIG. 1, the diffractive optical element 110 is fixably coupled to the optical fiber 116. In an exemplary embodiment, the period $\Lambda_D$ of the diffractive optical element is twice the period $\Lambda_G$ of the desired diffractive grating. The focused ultrashort laser pulses 108 may be scanned relative to the diffractive optical element 110 and optical fiber 116. The distance scanned corresponds to the desired length of the diffraction grating being formed in the optical fiber 116. In an exemplary embodiment, the interference region extends approximately 100 microns along the length of the optical fiber 116. In an exemplary embodiment, the focused ultrashort laser pulses 108 are scanned relative to the diffractive optical element 110 for a distance ranging from 0.5 mm to 10 cm.

The scanning rate may be chosen depending on desired exposure time of the optical fiber 116 to the interference pattern. A slower scanning speed may result in a longer exposure time of the optical fiber 116 to the interference pattern. A longer exposure time may form more distinct periodic changes in the index of refraction of the optical fiber 116. The scanning rate may also be varied according to the pulse rate and intensity of the laser 102. For a fixed exposure level, an increased intensity may allow a faster scanning rate and an increased pulse rate may allow a faster scanning rate. For example, a 1 KHz laser pulse rate with a scanning rate of 100 microns/second may provide exposure equivalent to a 10 Hz laser pulse rate with a scanning rate of 1 micron/second.

A first actuator 124 may be used to actuate the laser 102 and focusing lens 106. The first actuator 124 may actuate the laser 102 and focusing lens 106 relative to the optical fiber 116 and may actuate the laser 102 and focusing lens 106 relative to each other for adjusting the focus of the focused ultrashort laser pulses 108. A second actuator 126 may be used to actuate the coupled optical fiber 116 and diffractive optical element 110 relative to the focused ultrashort laser pulses 108.

A controller 122 may be used to control at least one of the first and second actuators 124, 126 to scan the focused ultrashort laser pulses 108 relative to the diffractive optical element 110. The controller 122 may also control the first actuator 124 to adjust the focus of the focused ultrashort laser pulses 108 and may control the operating characteristics (such as pulse width, wavelength, intensity, . . . ) of the laser 102.

Figure 2:
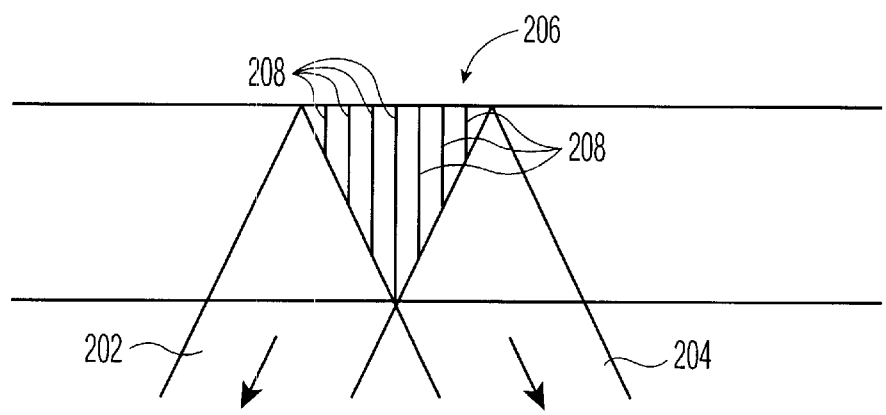
FIG. 2 illustrates regions of high intensity formed by the interference of first and second ultrashort laser pulses.

FIG. 2 illustrates the intersection of a first ultrashort laser pulse 202 and a second ultrashort laser pulse 204 generated by the diffractive optical element 110. In this exemplary embodiment, the first and second ultrashort laser pulses 202, 204 represent the −1 and +1 order beams, respectively, diffracted by the diffractive optical element 110. As known to those skilled in the art, the diffractive optical element 110 may be designed to suppress higher order diffractions.

The present invention is not limited to generating the first and second ultrashort laser pulses 202, 204 with a diffractive optical element 110. As known to those skilled in the art, accurately positioned separate synchronized ultrashort laser pulse sources may be used to generate the first and second ultrashort laser pulses 202, 204.

As shown in FIG. 2, the first and second ultrashort laser pulses 202, 204 intersect in a region 206. An interference pattern formed in the region 206 results in a periodic laser intensity in the region 206 of intersection. The periodic laser intensity may cause corresponding periodic changes in the refraction indexes of the core and cladding. The periodicity of the laser intensity in the intersection region 206 is represented by lines 208 which may correspond to the peaks in intensity, for example.

The interference effect caused by the intersection of the first and second ultrashort laser pulses 202, 204 may be enhanced by a non-linear effect caused by self-focusing of the first and second ultrashort laser pulses 202, 204 as they are transmitted through the optical fiber 116. Self-focusing is illustrated with reference to FIG. 3.

Figure 3:
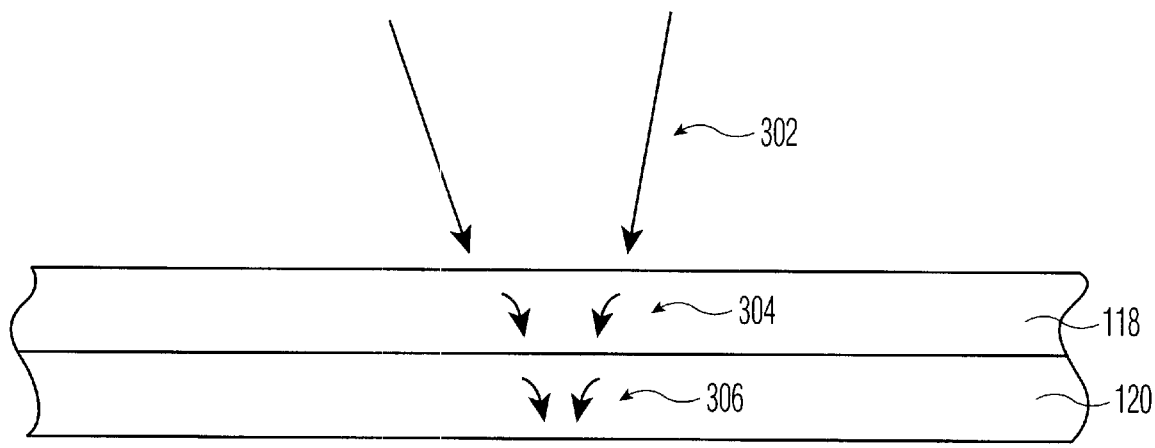
FIG. 3 illustrates self-focusing according to the present invention.

In FIG. 3, an ultrashort laser pulse 302 is directed to the cladding 118 of an optical fiber 116. The cladding 118 self-focuses the incoming ultrashort laser pulse 302 to produce a focused ultrashort laser pulse 304. The high intensity of the ultrashort laser pulse 302 focused on the cladding 118 causes the cladding 118 to act as a positive or focusing lens and focus the incoming laser pulse 302. The laser pulse as focused by the cladding 118 is illustrated by arrows 304. The focused ultrashort laser pulse 304 is further self-focused, cumulatively, by the core 120 as represented by arrows 306. Self-focusing is described by Y. R. Shen in *Principles of Nonlinear Optics* (1984), which is incorporated herein by reference for its teachings on self-focusing.

In an exemplary embodiment, the first and second ultrashort laser pulses 202, 204 are self-focused as they are transmitted through the cladding 118 and core 120 of an optical fiber 116. The positioning of the first and second ultrashort pulses 202, 204 relative to each other, the respective operating characteristics of the first and second ultrashort pulses 202, 204, and the composition of the optical fiber 116 may be configured to result in self-focusing of the first and second ultrashort pulses 202, 204 as they are transmitted through the optical fiber 116. The extent of focusing of the ultrashort laser pulses 104 by the lens 106 may be increased or decreased to correspondingly increase or decrease the resulting self-focusing. The effect of self-focusing on the interference pattern caused by the intersection of the first and second ultrashort laser pulses 202, 204 is described with reference to FIGS. 4A–4C.

Figure 4A:
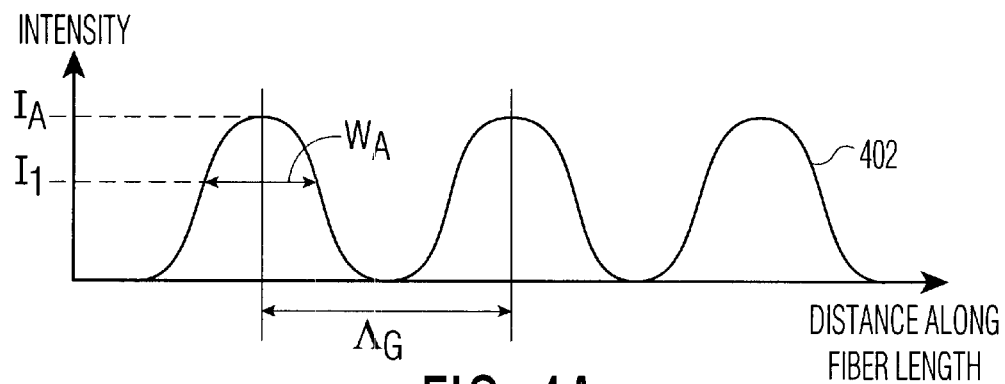
FIG. 4A is an intensity curve of interfering ultrashort laser pulses without being self-focused.

FIG. 4A shows a source laser intensity curve 402 representing laser intensity of interfering ultrashort laser pulses 202, 204 along the length of an optical fiber 116 without being self-focused. The source laser intensity curve 402 has peak intensities $I_A$ and is sinusoidal with a period of $\Lambda_G$. A width $W_A$ of the optical fiber is exposed to a predetermined intensity $I_1$.

Figure 4B:
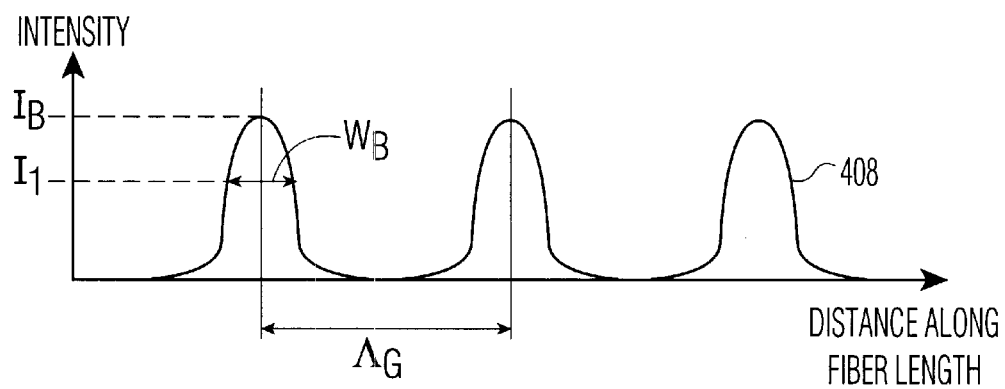
FIG. 4B is an intensity curve illustrating the intensity of self-focused interfering ultrashort laser pulses in the cladding of an optical fiber.

FIG. 4B shows a cladding intensity curve 408 representing the laser intensity of interfering ultrashort laser pulses 202, 204 in the cladding 118 of an optical fiber 116. The interfering ultrashort laser pulses 202, 204 are self-focused as they progress through the cladding 118. The self-focusing results in laser intensity being distorted from the source laser intensity curve 402 to the cladding intensity curve 408. The cladding intensity curve 408 has the same period $\Lambda_G$ as the source laser intensity curve 402 but the intensity distribution has been altered and is no longer sinusoidal.

Self-focusing transforms the sinusoidal intensity curve 402 to have higher intensity peaks with narrower intensity widths. This is known as reducing the filling fraction of the intensity curve. For example, the peak intensities $I_B$ in the cladding 118 are greater than the peak intensities $I_A$ of the source intensity curve 402 ($I_B>I_A$). The width $W_B$ of the cladding fiber exposed to the predetermined intensity $I_1$ is less than the width $W_A$ ($W_B<W_A$).

The filling fraction may be defined as the width of the intensity curve above a predetermined intensity compared to the grating period. In an exemplary embodiment, the predetermined intensity is defined as half of the maximum intensity value and the full-width at half maximum (FWHM) may be reduced by approximately 50 percent.

Figure 4C:
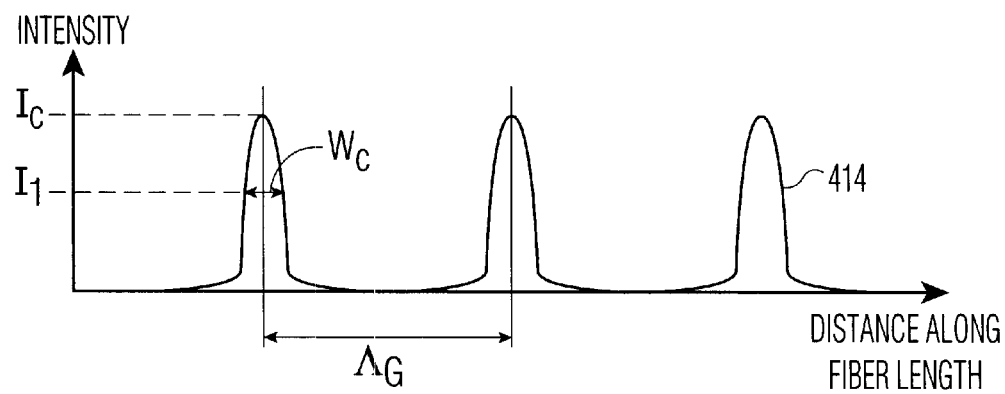
FIG. 4C is an intensity curve illustrating the intensity of self-focused interfering ultrashort laser pulses in the core of an optical fiber.

FIG. 4C shows a core intensity curve 414 representing the laser intensity of interfering ultrashort laser pulses 202, 204 in the core 120 of an optical fiber 116. The ultrashort laser pulses 202, 204 are cumulatively self-focused as they progress through the cladding 118 and into the core 120 of the optical fiber 116. The core intensity curve 414 has the same period $\Lambda_G$ as the source and cladding laser intensity curves 402, 408, but the intensity distribution has been further altered. Self-focusing of the ultrashort laser pulses 202, 204 in the core causes the laser intensity in the core 120 to have higher peak intensities $I_C$ than the peak cladding intensities $I_B$ ($I_C>I_B>I_A$) and a width $W_C$ at the predetermined intensity $I_1$ less than the width $W_B$ ($W_C<W_B<W_A$).

As shown above with reference to FIGS. 4A–C, the interference pattern is enhanced by the non-linear effect of self-focusing. The effect of self-focusing is cumulative resulting in the core intensity curve 414 being further enhanced than the cladding intensity curve 408. In an exemplary embodiment, the core 120 comprises germanium which causes a further greater percentage change in the core index of refraction than in the cladding index of refraction.

As known to those skilled in the art, the extent of self-focusing of the laser pulses 202, 204 by the optical fiber depends on the intensity of the incoming laser pulses 202, 204. A greater intensity may cause the incoming pulses 202, 204 to focus faster or tighter than a lower intensity incoming pulse and cause greater distortion of the source laser intensity profile.

The diffraction grating in the optical fiber 116 is formed by changes in the index of refraction of the optical fiber 116 caused by the intensity of the applied laser pulses. Without self-focusing, the interference pattern and resulting diffraction grating in the cladding and core would correspond to the sinusoidal curve 402 in FIG. 4A.

In the exemplary embodiment described above, the intensity distributions of FIGS. 4B and 4C result in an improved diffraction grating. The diffraction grating is improved because rather than sinusoidal variations in the index of refraction, the diffraction grating includes periodic variations in the index of refraction having comparatively higher and narrower peak index of refraction variations. The induced refractive index change in the optical fiber is proportional to the laser intensity. Narrow and higher intensity peaks in the intensity result in higher index of refraction changes with higher contrast. This results in an improved grating having a higher diffraction efficiency.

According to an exemplary embodiment of the present invention, the percentage change of the index of refraction of the optical fiber is of the order of $10^{-2}$. In comparison, an excimer laser may provide a percentage change of the index of refraction of the optical fiber of the order of $10^{-3}$ or $10^{-4}$.

The teachings of the present invention are applicable to both single mode optical fibers and multi-mode optical fibers. In an exemplary embodiment, the interfering first and second ultrashort laser pulses 202, 204 cause a multi-photon effect which further increases the percentage change in the index of refraction of the optical fiber.

According to an exemplary embodiment of the present invention, the laser 102 provides a laser beam 104 having an infrared (IR) wavelength. In an exemplary embodiment, the laser 102 provides a laser beam 104 having a wavelength ranging between 500 nm and 1500 nm. In another exemplary embodiment, the laser 102 provides a laser beam 104 having a wavelength of 775 nm.

Diffraction gratings are often formed in optical fibers using ultraviolet (UV) wavelength lasers. In order to cause an index of refraction change using a UV laser, optical fibers are often treated. For example, optical fibers may be treated in a high pressure hydrogen atmosphere over a prolonged duration to diffuse hydrogen into the fiber. This is often called hydrogen loading. In addition to creating an improved diffraction grating in comparison to one formed using a UV laser without self-focusing, the present invention also reduces manufacturing cycle time and cost by reducing the need to perform hydrogen loading. In an exemplary embodiment of the present invention, a diffraction grating is formed in an undoped silica fiber.

The present invention is not limited to forming diffraction gratings in optical fibers. For example, the teachings of the present invention may be used to form diffraction gratings other transparent materials such as bulk glass. According to the present invention, a diffraction grating may be formed using a non-UV wavelength which allows the laser to penetrate deep into the transparent material. In contrast, a UV wavelength laser may be quickly absorbed near the surface of the material. In an exemplary embodiment of the present invention, a diffraction grating is formed at a depth greater than 50 $\mu$m below the surface of a material.

In an exemplary embodiment of the present invention, the diffractive optical element has a period $\Lambda_D$=1550 nm and the diffraction grating has a period $\Lambda_G$=775 nm and a filling factor of 25%. The laser 102 provides a ultrashort laser pulses 104 having a pulse width of 150 fs, a wavelength of 800 nm, a pulse repetition frequency of 1 kHz, and an average power of 1 W.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for forming a diffraction grating in a optical fiber having a first index of refraction comprising the steps of:

(a) generating a first ultrashort laser pulse;
(b) generating a second ultrashort laser pulse; and
(c) positioning the first and second ultrashort laser pulses to intersect each other to form an interference pattern within the optical fiber, wherein the interference pattern includes periodic intensity variations which cause corresponding periodic changes from the first index of refraction of the optical fiber and wherein the positioning of the first and second ultrashort pulses relative to each other, respective operating characteristics of the first and second ultrashort pulses, and composition of the optical fiber are configured to result in self-focusing of the first and second ultrashort pulses as they are transmitted through the optical fiber.

2. A method according to claim 1 wherein the optical fiber includes a core surrounded by a cladding and the first and second ultrashort pulses are self-focused as they are transmitted through the cladding which enhances the self-focusing of the first and second ultrashort pulses as they are transmitted through the core.

3. A method according to claim 2 wherein the core has a core index of refraction and the cladding has a cladding index of refraction and further including the steps of providing, as the core a core comprising germanium which causes greater change in the core index of refraction than in the cladding index of refraction.

4. An optical fiber having a diffraction grating formed therein, wherein the diffraction grating has been formed according to the method of claim 1.

5. An optical fiber according to claim 4 wherein the diffraction grating has a filling factor less than 50 percent.

6. An optical fiber according to claim 4 wherein the periodic variations of the index of refraction of the optical fiber include peak variations of the index of refraction having a percentage change of the index of refraction greater than 0.01.

7. An optical fiber according to claim 4 including a core and a cladding wherein the core has a core index of refraction and the cladding has a cladding index of refraction and wherein the core comprises germanium which causes greater change in the core index of refraction than in the cladding index of refraction.

8. A method according to claim 1 wherein the positioning of the first and second ultrashort pulses relative to each other, the respective operating characteristics of the first and second ultrashort pulses, and the composition of the optical fiber are configured to reduce a filling fraction of periodic intensity variations by approximately 50 percent.

9. A method according to claim 1 wherein the first and second ultrashort laser pulses have respective intensities adjusted to cause a percentage change in the index of refraction of the optical fiber greater than 0.01.

10. A method according to claim 1 wherein the positioning of the first and second ultrashort pulses relative to each other, the respective operating characteristics of the first and second ultrashort pulses, and the composition of the optical fiber are configured to result in a multi-photon effect to increase the changes from the first index of refraction of the optical fiber.

11. A method according to claim 1 wherein the diffractive optical element is fixably coupled to the optical fiber and the method further comprises the step of scanning one of the focused ultrashort laser pulses and the coupled optical fiber and diffractive optical element with respect to the other and wherein a scan rate is varied according to a pulse duration and intensity of the focused ultrashort laser pulse.

12. An apparatus for forming a diffraction grating in an optical fiber having a first index of refraction comprising:

(a) means for generating first and second ultrashort laser pulses;

(b) means for positioning the first and second ultrashort laser pulses to intersect each other to form an interference pattern within the optical fiber, wherein the interference pattern includes periodic intensity variations which cause corresponding periodic changes from the first index of refraction of the optical fiber and wherein said periodic changes permanently and physically alter the optical fiber.

13. An apparatus according to claim 12 wherein the means for generating the first and second ultrashort laser pulses comprise:

a laser for generating a source ultrashort laser pulse;

a focusing lens for focusing the source ultrashort laser pulse; and a diffractive optical element for receiving the focused source ultrashort laser pulse and providing the first and second ultrashort laser pulses.

14. An apparatus according to claim 13 wherein the source ultrashort laser pulse has a wavelength between 400 nm and 3000 nm.

15. An apparatus according to claim 14 wherein the source ultrashort laser pulse has a pulse width of approximately 150 fs and a pulse repetition frequency of approximately 1 khz.

16. An apparatus according to claim 13 wherein the diffractive optical element is fixably coupled to the optical fiber and the apparatus further comprises:

an actuator for adjusting the position of one of the focused source ultrashort laser pulse and the coupled optical fiber and diffractive optical element; and a controller for controlling the actuator to scan the focused source ultrashort laser pulse with respect to the coupled optical fiber and diffractive optical element.

17. An apparatus according to claim 12 wherein the optical fiber includes a core having a core index of refraction surrounded by a cladding having a cladding index of refraction and the core comprises germanium which causes greater change in the core index of refraction than in the cladding index of refraction.

18. An apparatus according to claim 12 wherein positioning of the first and second ultrashort pulses relative to each other, respective operating characteristics of the first and second ultrashort pulses, and composition of the optical fiber are configured to result in a multi-photon effect to increase the changes from the first index of refraction of the optical fiber.

19. An apparatus for forming a diffraction grating in an optical fiber having a first index of refraction comprising:

(a) means for generating first and second ultrashort laser pulses;

(b) means for positioning the first and second ultrashort laser pulses to intersect each other to form an interference pattern within the optical fiber, wherein the interference pattern includes periodic intensity variations which cause corresponding periodic changes from the first index of refraction of the optical fiber and wherein said periodic changes permanently and physically alter the optical fiber; wherein positioning of the first and second ultrashort pulses relative to each other, respective operating characteristics of the first and second ultrashort pulses, and composition of the optical fiber are configured to result in self-focusing of the first and second ultrashort pulses as they are transmitted through the optical fiber.

20. An apparatus according to claim 19 wherein the first and second ultrashort pulses are configured to reduce a filling fraction of periodic intensity variations by about 50 percent relative to the filling fraction of a diffraction grating without self focusing.

21. An apparatus according to claim 19 wherein the first and second ultrashort laser pulses have respective intensities adjusted to cause a percentage change in the index of refraction of the optical fiber greater than 0.01.

* * * * *